May 12, 1959 D. L. RITTER ET AL 2,886,265
LIGHT WEIGHT PNEUMATIC AIRPLANE
Filed Feb. 10, 1956
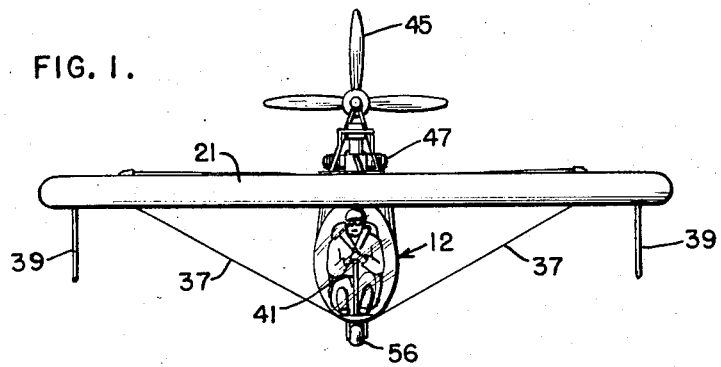
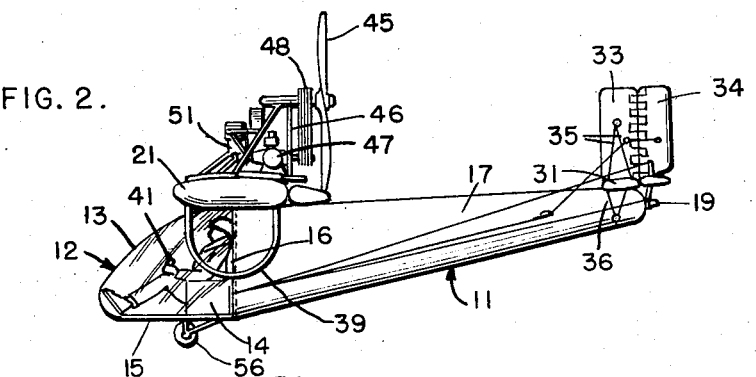
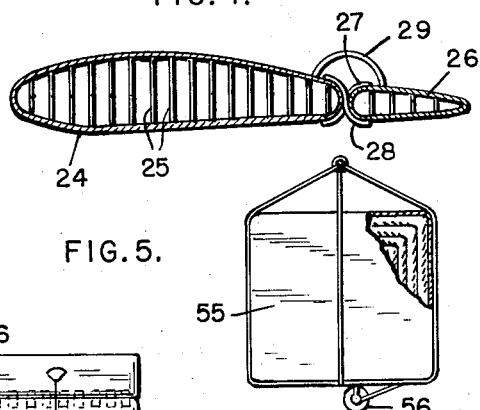
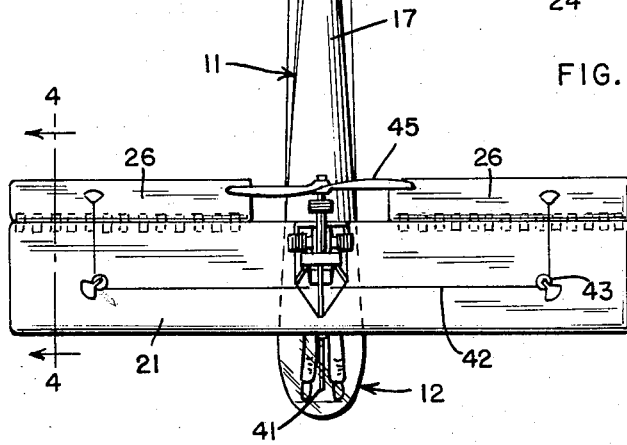
DARREL L. RITTER
LEO B. BLOCKER
JULIAN WILLCOX
INVENTORS
BY
ATTORNEYS

United States Patent Office

2,886,265
Patented May 12, 1959

2,886,265

LIGHT WEIGHT PNEUMATIC AIRPLANE

Darrell L. Ritter, Washington, D.C., and Leo B. Blocker and Julian Willcox, Falls Church, Va., assignors to the United States of America as represented by the Secretary of the Navy Application February 10, 1956, Serial No. 564,834

4 Claims. (Cl. 244—117)

(Granted under Title 35, U.S. Code (1952), sec. 266)

The invention described herein may be manufactured and used by or for the Government of the United States of America for governmental purposes without the payment of any royalties thereon or therefor.

This invention relates to a light weight pneumatic airplane or more particularly to a flexible and foldable airplane formed of flexible sheet material which may be folded into a small package and later inflated to extend the fuselage and wing member into flight position.

Heretofore pilots downed behind enemy lines or in enemy territory have had no means of escape and were likely to fall into the hands of the enemy. Numerous escape devices have been proposed but none have proved entirely suitable for all involve the use of large or slow moving aircraft which must remain in the vicinity of the downed pilot for a sufficient length of time to effect the rescue, thus revealing the position of the downed pilot. Such craft are further vulnerable to enemy ground forces or aircraft, being substantially unable to retaliate during the rescue operation.

By the utilization of our invention rescue of a downed pilot may be quickly effected with minimum hazard to the downed pilot and the pilot of the rescue craft. The rescue pilot need only drop a packaged inflatable plane of this invention to the downed pilot who then wheels the package to a suitable open space for take-off and quickly inflates the plane. Thereafter, the pilot enters the plane and takes off. Since the plane is small and light, take-off is possible in a small cleared area and over rough terrain. Accordingly, it is an object of this invention to provide a light weight pneumatic airplane.

It is a further object of this invention to provide a light weight foldable fabric airplane capable of being self-sustaining in flight configuration when inflated.

It is a still further object of this invention to provide an airplane formed of flexible sheet material having propulsion means and capable of powered take-off and flight.

It is an additional object of this invention to provide a powered airplane which may be inflated and in which the power means may be utilized to rapidly inflate the plane.

It is another object of this invention to provide a collapsible airplane which may be parachuted to a downed pilot to permit him to escape.

Further, additional objects will become apparent as the following specification, descriptive of a preferred embodiment of the invention, is read in connection with the drawing, of which:

Fig. 1 is a front elevation of the airplane of this invention;

Fig. 2 is a side elevation of the improved airplane;

Fig. 3 is a plan view taken from above the airplane;

Fig. 4 is a cross-section taken through the wing taken on the line 4—4 of Fig. 3; and Fig. 5 is a view, partially in section, illustrating the airplane of this invention folded and packaged for air drop.

Referring now to Fig. 2 of the drawing, the fuselage designated generally at 11 comprises a forward nose portion 12 having a canopy 13 of transparent plastic having a pilot's seat 14 secured to a floor 15 to which is suitably secured a back-rest 16. Floor 15 and back-rest 16 may be formed of rigid material or may comprise a frame such as, for example, may be of tubular aluminum supporting a flexible sheet material. The back-rest 16 preferably, though not necessarily, forms a partition between the nose portion 12 and the rear portion 17 of the fuselage 11, now to be described.

The rear portion of the fuselage 11, numbered 17, comprises a conical, tubular sleeve sealed at the forward end by the nose portion 12 or the partition 16 and is suitably secured thereto as by an adhesive or other fastening means. The fuselage 17 is preferably formed of a flexible, coated fabric such as a woven fabric coated with a rubber or resin as is well known in the art, or it may be formed of self-sustaining plastic film having sufficient strength to air under pressure of approximately 15 p.s.i. Such films, as "Pliofilm," are well known, having been used extensively as balloon vehicles, and form no part of this invention.

At the rear of the fuselage 17, the small end of the cone is closed by a relief valve 19 which will vent the gas from the fuselage when the pressure therein exceeds the pressure for which the valve is set. Such valves are well known in the art and are here utilized for a purpose herein described.

Secured to the fuselage 11 adjacent to the forward end is a wing structure 21, here illustrated as mounted adjacent the nose and on the top of the fuselage. It will be understood that any well-known airplane configuration may be used, it being necessary only that the design be aerodynamically stable in flight.

The wing comprises a tube 21 formed of a coated fabric or plastic film similar to that utilized for the fuselage 17. The tube is closed at the ends 22 and suitably secured to the fuselage 17 as by an adhesive or by stitching or by other well-known fastening means. The material forming opposed upper and lower surfaces 23 and 24 of the wing 21 is maintained in airfoil configuration with cambered upper and lower surfaces by threads, tapes or webs 25 extending between facing interior faces of the sheet material forming the wing. It will be understood that members 25 may be secured to the sheet material in any suitable manner, as by stitching or by the use of an adhesive. I prefer, however, to use a material known as "Airmat" in which the tube 21 is woven integrally with cross threads 25 extending between the sheet portions 23 and 24. It will be understood that by suitably predetermining the lengths of threads 25 and coating the fabric so as to make it impervious to air, the tube 21 upon inflation will assume the configuration of an airfoil with cambered top and bottom surfaces.

The wing 21 is completed by the aileron sections 26 formed preferably in the same manner as the wing portion 21 and hingedly connected to form the trailing edge of the wing by the flexible tape members 27 and 28, alternately secured, as by adhesive, to the wing and aileron, respectively, and extending from the top of the rear edge of the wing to lower surface of the forward edge of the aileron and vice versa. A flexible tube may connect the aileron 26 to the wing 21.

Additional control members may comprise the horizontal stabilizers 31 having hingedly secured thereto the elevators 32. Similarly, vertical stabilizer 33 has hingedly secured thereto the rudder 34. It will be understood that these members 31, 32 and 33, 34 may be fabricated and hinged in the same manner as the wing 21 and aileron 26 and suitably secured, preferably adhesively to the rear end of fuselage 17. It will be understood that any suitable aerodynamic configuration of control members may be used, and that here illustrated is but exemplary.

To brace the control surfaces and make them more rigid, guy wires, such a wires 35, may extend diagonally from the vertical stabilizer 33 to the horizontal stabilizers 31, and wires 36 may extend from beneath the stabilizers 31 to the fuselage 17. Similarly, wires or braces 37 may extend from beneath the wing to the fuselage 11 adjacent the nose 12. The wings 21 may also be provided with skids 39 to aid in take-off and landing. It will be understood that wing floats could readily replace the skids 39 where water landing or take-off is contemplated since the fuselage will be buoyant and capable of either mode of landing or take-off.

The control members 26, 32 and 34 may be actuated in conventional fashion from as a stick 41 in the nose 12 and connected to the aforesaid members by suitable control wires as the wire 42, shown in Fig. 3 on the surface of the wing 21. Suitable pulleys 43 may be mounted as on the wing 21 to guide the wires in their movement.

The plane of this invention is propelled by a propeller 45 journalled in a suitable bearing supported on the rigid trapezoidal frame 46 suitably secured to the plane structure as by lacing or the like. As here illustrated, the frame is mounted above the wing and a pusher propeller is used to insure maximum safety for the pilot. A small light-weight reciprocating motor 47 is mounted on the frame and connected to the propeller as by belt drive 48. Suitable throttle controls are brought into the nose 12 so as to be accessible to the pilot. Any suitable tank means may be provided for the storage of fuel.

Also mounted on the frame structuure 46 is the compressor 51, belt driven from motor 47 and having a compressed air line (not shown) leading to the wing 21. By providing suitable interconnecting openings, such as 29 between the wing and fuselage and the fuselage and tail control members, air compressed by the pump will be delivered to all parts of the airplane to maintain it in inflated condition for flight. Relief valve 19 maintains the pressure at the desired predetermined pressure and vents excess air delivered by the pump. In this way, the pump may be operated continuously during flight and will maintain the pressure in the plane even if the plane is punctured by a bullet. It will be understood that, if desired, hose leading directly from the pump to each of the elements of the plane could be installed, preferably internally of the plane.

If a rigid plastic is used for the canopy 13, the pilot's compartment need not be pressurized. This would be desirable if a $CO_2$ pressure bottle were used to hasten the inflation process initially. However, if an air-pressure bottle were used, or the pumps alone relied upon, the canopy 13 could be of flexible transparent plastic which would be inflated in the same way as the fuselage. In the latter case, a foot-operated pump could supplement the compressor. It is contemplated that the foot pump or pressure bottle will be discarded before take-off to reduce the weight carried by the plane.

The deflated device is packaged, as shown in Fig. 5, preferably by removing the propeller 45 from its shaft and folding the wings compactly around the motor and propeller. The collapsed fuselage is then rolled or folded and the whole device is supported by the floor 15, thus forming a compact package 55, supported on wheel 56, which will later serve for take-off.

Alternatively, the wheel 56 may be detached from the plane and secured to the package where it will serve to enable the would-be pilot to easily move the plane to a position where it may be inflated. After inflation, the wheel may be reattached to the plane. The package may be provided with suitable means for attachment to the shroud lines of a parachute, as is well known.

Obviously many modifications and variations of the present invention are possible in the light of the above teachings. It is therefore to be understood that within the scope of the appended claims the invention may be practiced otherwise than as specifically described.

We claim:

1. An inflatable and foldable airplane having flexible wings and fuselage portions adapted to be alternately inflated and folded, a rigid floor in the bottom forward portion of said fuselage portion, a power plant positioned above said rigid floor, wheel means positioned on the underside of said rigid floor and providing mobility for said airplane when said airplane is either folded or inflated, inflating means drivingly connected to said power plant whereby said airplane may be inflated by said power plant preparatory to take-off.

2. A pneumatic airplane having flexible wing and fuselage portions adapted to be alternately inflatable into operative condition and foldable into packaged condition, a rigid floor positioned in the bottom forward section of said fuselage portion, a pilot's compartment positioned in said fuselage portion above said rigid floor, power means positioned above said pilot's compartment, a compressor drivingly connected to said power means to inflate said airplane, said rigid floor forming alternately, the bottom of said pilot's compartment and the bottom of the package when said airplane is in said operative condition and said packaged condition respectively, a wheel positioned in said rigid floor whereby said airplane is mobilized.

3. The airplane of claim 2 further defined in that said wheel is detachable to facilitate packaging and constitutes the entire rotary support for the airplane.

4. An inflatable, collapsible, and foldable airplane comprising an inflatable fuselage member, rigid members positioned forwardly on said fuselage to form a frame, an inflatable foldable wing member secured to said fuselage, said wing member being substantially of airfoil shape when inflated, a single motor mounted on said frame centrally and above the forward portion of said fuselage, a compressor for inflating said airplane adjacent said motor so that the foldable portions of the airplane may readily be wrapped up and about the motor and compressor for packaging purposes, said motor being drivingly connected to said compressor to inflate the fuselage and wing members.

References Cited in the file of this patent

UNITED STATES PATENTS

| 1,477,338 | Finley | Dec. 11, 1923 |
| 2,616,509 | Thomas | Nov. 4, 1952 |
| 2,698,020 | Phane | Dec. 28, 1954 |

FOREIGN PATENTS

| 28,704 | Great Britain | 1911 |

OTHER REFERENCES

"The Take-Off," (magazine published by the Washington, D.C., Air Legion).

"Flight Magazine," p. 246, Aug. 19, 1955.

Notice of Adverse Decision in Interference

In Interference No. 90,601 involving Patent No. 2,886,265, D. L. Ritter, L. B. Blocker, and J. Willcox, Light weight pneumatic airplane, final judgment adverse to the patentees was rendered Dec. 7, 1962, as to claim 4.

[*Official Gazette February 5, 1963.*]